United States Patent
Sprauve et al.

(10) Patent No.: US 9,923,851 B1
(45) Date of Patent: Mar. 20, 2018

(54) CONTENT MANAGEMENT FEATURES FOR MESSAGING SERVICES

(71) Applicant: Dropbox, Inc., San Francisco, CA (US)

(72) Inventors: Eric Sprauve, San Francisco, CA (US); Jong-Moon Kim, San Francisco, CA (US); Kristin Boyer, San Francisco, CA (US); Thomas Le Jeune, San Francisco, CA (US); Thomas Wright, San Francisco, CA (US); Vinod Valloppillil, Berkeley, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 15/396,210

(22) Filed: Dec. 30, 2016

(51) Int. Cl.
| | |
|---|---|
| *G06F 15/16* | (2006.01) |
| *H04L 12/58* | (2006.01) |
| *H04L 29/08* | (2006.01) |
| *G06F 3/0482* | (2013.01) |
| *G06F 3/0481* | (2013.01) |

(52) U.S. Cl.
CPC ........... *H04L 51/08* (2013.01); *G06F 3/0482* (2013.01); *H04L 51/22* (2013.01); *H04L 67/02* (2013.01); *G06F 3/04817* (2013.01)

(58) Field of Classification Search
CPC ......... H04L 51/08; H04L 67/02; H04L 51/22; G06F 3/0482; G06F 3/04817
See application file for complete search history.

(56) References Cited

U.S. PATENT DOCUMENTS

| | | | |
|---|---|---|---|
| 8,260,861 B1 | 9/2012 | Bruno et al. | |
| 8,732,853 B1 * | 5/2014 | Byrne | H04L 63/0838 |
| | | | 713/183 |
| 9,203,904 B2 | 12/2015 | Maldaner | |
| 9,413,809 B1 * | 8/2016 | Morse | H04L 67/02 |
| 2002/0129119 A1 | 9/2002 | Aoki | |
| 2005/0193070 A1 | 9/2005 | Brown | |
| 2008/0016160 A1 | 1/2008 | Walter et al. | |
| 2008/0032739 A1 | 2/2008 | Hoodbhoy | |
| 2009/0259722 A1 | 10/2009 | Sundaram | |
| 2012/0151379 A1 * | 6/2012 | Schultz | H04L 51/08 |
| | | | 715/752 |
| 2012/0233227 A1 | 9/2012 | Alexander et al. | |

(Continued)

OTHER PUBLICATIONS

Julyighor, "Dropbox Plugin for Windows," Sourceforge, ourceForge Media, LLC dba Slashdot Media, La Jolla, CA (Downloaded Dec. 1, 2016 from https://sourceforge.net/projects/dropboxcopyplug/).

(Continued)

*Primary Examiner* — John B Walsh
(74) *Attorney, Agent, or Firm* — Polsinelli PC

(57) ABSTRACT

Disclosed are systems, methods, and non-transitory computer-readable storage media for providing content management features in a messaging service. A messaging client receives a reference to a content item stored on a content management system and receives, from the content management system, a set of sharing options for the content item. The set of sharing options is presented to the user via the messaging client and a user selection of sharing options is received. The messaging client sends the user selection of sharing options to the content management system, wherein the content management system is configured to apply the user selection of sharing options to the content item.

19 Claims, 11 Drawing Sheets

(56) References Cited

U.S. PATENT DOCUMENTS

| | | |
|---|---|---|
| 2012/0278405 A1 | 11/2012 | Costenaro |
| 2013/0014023 A1* | 1/2013 | Lee .................... G06Q 10/103 |
| | | 715/751 |
| 2013/0275509 A1* | 10/2013 | Micucci ................. H04L 67/02 |
| | | 709/204 |
| 2014/0081901 A1 | 3/2014 | Szymczak |
| 2014/0280602 A1 | 9/2014 | Quatrano |
| 2016/0373515 A1* | 12/2016 | Jagad ..................... H04L 67/06 |

OTHER PUBLICATIONS

Singh, Gurpreet, et al. CLOUD Epoch: Storage as a Service, International Journal of Computer Applications & Information Technology, vol. 1, Issue II, Sep. 2012 (ISSN: 2278-7720) p. 15-17.

* cited by examiner

CONTENT MANAGEMENT FEATURES FOR MESSAGING SERVICES

BACKGROUND

The present disclosure relates generally to content management services and in particular to selectively providing content management features within an existing messaging client.

Content management services allow users to access and manage content across multiple devices using a network. In a typical content management service, a user establishes a content management account with the service provider and can associate various content items with the content management account. For example, content management services may allow the user to store content items (including but not limited to text documents; email messages; text messages; other types of messages; media files such as photos, videos, and audio files; and/or folders containing multiple files). Some content management services may allow users to set sharing options for stored content items in order to control whether and how other users are able to access the content items.

Messaging services enable users to communicate with one another. The messaging services may include email, instant messaging (IM), or social networking services. In some cases, messaging services also allow for the transmittal of content items as attachments. For example, an email service may allow a user to compose an email, attach a file from the user's local machine, and send the file to a recipient through the email service. After the sent email is received, the recipient can open the email, download the attached file to the recipient's local machine, and view or otherwise use the attached file.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for providing content management features in a messaging service. An example computer implemented method to provide content management features in a messaging service includes a messaging client on a client device receiving a reference to a content item stored on a content management system and receives, from the content management system, a set of sharing options for the content item. The set of sharing options is presented to the user via the messaging client and a user selection of sharing options is received. The messaging client sends the user selection of sharing options to the content management system, wherein the content management system is configured to apply the user selection of sharing options to the content item.

In another example computer implemented method to provide content management features in a messaging service includes receiving, in a messaging client on a client device, a reference to a message sent by a messaging service and determining that the message contains an attached link associated with a content item stored on a content management system. The method further includes sending a request for sharing state information associated with the content item sending to the content management system and receiving sharing state information associated with the content item. The sharing state information associated with the content item can then be displayed in the messaging client on the client device.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for providing content management features in a messaging service. In general, online messaging services and content management services have been provided as separate services by separate service providers. These separate services may be provided on separate physical platforms, each with their own procedures, infrastructure, access gateways, etc. As a result, attempts to provide the breadth of features enabled by content management services within messaging services has faced numerous technical obstacles rooted in computer technology and, in particular, the internet. For example, some messaging services are able to track delivery of a message and/or whether a message has been viewed by a recipient because the message and access to the message is controlled by the messaging platform. However, the messaging services are unable to track whether underlying content delivered by the message (e.g., attached content) has been viewed, when it has been viewed, or who has viewed the content because access to that content is not controlled by the messaging platform.

The technical obstacles have also limited messaging services from offering more content management features. Some initial attempts to integrate content management features within messaging services include providing an interface within a messaging client that enables a user to access a content management system and attach links to content items stored on the content management system. The disclosed technology overcomes many of these technical obstacles and allows for further integration of content management features, such as sharing options and sharing state information, into messaging services.

Figure 1:
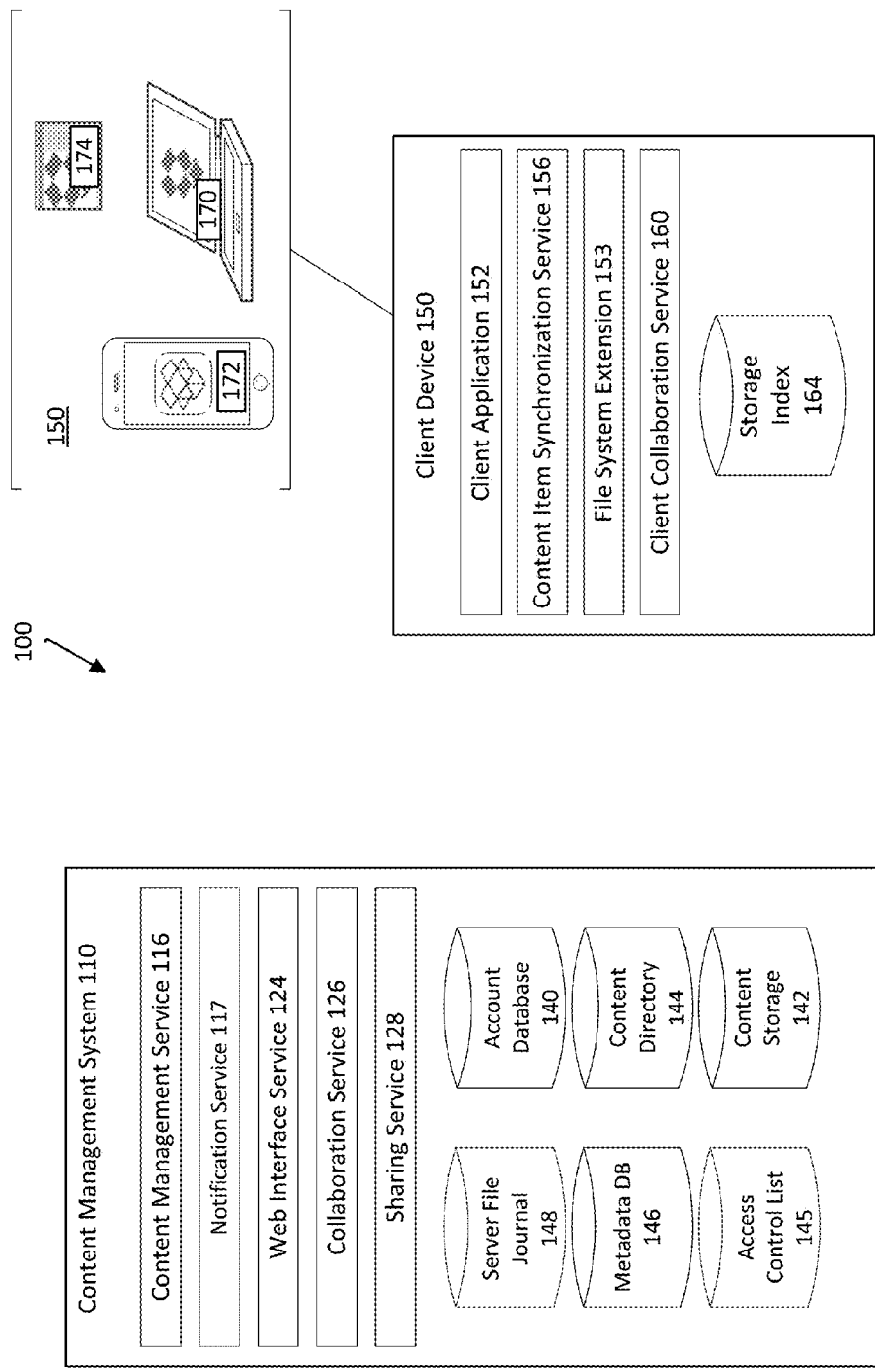
FIG. 1 shows an example configuration of devices and a network in accordance with some embodiments.

In some embodiments, the disclosed technology is deployed in the context of a content management system having content item synchronization capabilities and collaboration features, among others. An example system configuration 100 is shown in FIG. 1, which includes content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 145. Account database 140 can store profile information for registered entities. In some cases, profile information for a registered entity can include a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of a group can inherit the permissions. For example, a marketing group can have access to one set of content items while an engineering group can have access to another set of content items. An administrative group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 can be combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller blocks of data for storage at content storage 142. The location of each data block making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can almost always ensure that content item duplicates are recognized as such since the deterministic hash function will generally output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users Content management service 116 can define or record a content path for a content item wherein the "root" node of a directory structure can be a namespace for each account.

Within the namespace can be a directory structure defined by a user of an account and/or content management service 116. Content directory 144 can store the content path for each content item as part of a content entry.

In some embodiments, the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure can be a comfortable navigation structure for users, but does not necessarily correlate to storage locations of content items in content storage 142.

While the directory structure in which an account views content items does not necessarily correlate to storage locations at content management system 110, the directory structure can generally correlate to storage locations on client device 150 depending on the file system used by client device 150.

As addressed above, a content entry in content directory 144 can also include the location of each block of data making up a content item. More specifically, the content entry can include content pointers that identify the location in content storage 142 of the data blocks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control system that tracks changes to content items, different versions of content items (including diverging version trees), and a change history that can be acquired from the server file journal 148. The change history can include a set of changes that, when applied to the original content item version, produces the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications executing on the device. Client device 172 is a computing device in which content items may only be accessible to a specific application or by permission given by the specific application, and the content items can be stored in an application specific space and/or in a remote network. Client device 174 is any client device accessing content management system 110 via a web browser and accessing content items via a web interface. While example client devices 170, 172, and 174 are depicted in form factors such as a laptop, mobile device, or web browser, it should be understood that these descriptions do not limit clients devices to these form factors. For example, a mobile device, such as client device 172, may have a local file system accessible by multiple applications executing on the device, or client device 172 may access content management system 110 via a web browser. As such, the form factor should not be considered limiting when considering client device 150's capabilities. One or more functions described in this disclosure with respect to client device 150 may or may not be available on every client device depending on the specific capabilities of the device—the file access model being one such capability.

In many embodiments, client devices are associated with an account of content management system 110, but in some embodiments, client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments in which client device 150 initiates synchronization of content items with content management system 110, a user can manipulate content items directly from the file system of client device 150, while file system extension 156 (which can be integrated with the local file system, or even the operating system kernel) can intercept read, write, copy, move, delete commands relative to content items in the designated location of the file system of client device 150.

When file system extension 156 detects a write, move, copy, or delete command, it can notify content item synchronization service 156, which can synchronize the changes to content management system service 116. In some embodiments, content item synchronization service 156 can perform some functions of content management system service 116 including functions addressed above such as dividing a content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and/or deleting content on client storage as appropriate. Content management service 116 can store the changed or new block for the content item and update server file journal 148, metadata database 146, content directory 144, content storage 142, account database 140, etc., as appropriate.

When synchronizing content from content management system 110 to client device 150, a modification, addition, deletion, and/or move of a content item recorded in server file journal 148 can trigger delivery of a notification to client device 150 using notification service 117. When client device 150 receives the notification of the change to server file journal 148, client device 150 can check storage index 164 to determine if the time stamp of the change occurred since the last synchronization, or determine if the specific change has been synchronized. When client device 150 determines that it is out of synchronization with content management system 110, content item synchronization service 156 can request content item blocks including the changes, and client device 150 can update its local copy of the changed content items. In some embodiments, notification service 117 can query other services or databases of content management system 110, such as server file journal 148, to gain more context for the notification, to determine if a notification can be batched with another notification, or to supplement a notification, etc.

Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and improve performance of client device 150 and content management system 110 by reducing the processing, memory, storage, and network resources that would otherwise be consumed by synchronizing all content.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing of content via sharing service 128. Accounts of content management system 110 can share content with one another by providing a link to the content. Sharing service 128 can then provide access to the shared content item from any computing device in network communication with content management system 110. However, in some embodiments, a link can be associated with access restrictions enforced by content management system 110. Sharing service 128 can also facilitate indirect sharing of content within content management system 110 by enabling an account to share shared content with at least one additional user account (in addition to the original user account associated with the content item) so that each user account has access to the content item. The additional user account can gain access to the content by accepting the content, which will then be accessible via web interface service 124 or the directory structure associated with the additional user's account on client device 150. The sharing can be performed in a platform agnostic manner. That is, the content can be shared across multiple client devices 150 of varying types, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 may generate a custom network address, such as a uniform resource locator (URL), which can allow any web browser to access the content item or collection in content management system 110 without authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110. Content management system 110 can then use the received content identification data to identify the appropriate content item and return the content item.

In addition to generating the URL, sharing service 128 can also record the URL in access control list database 145. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, e.g., from within a corporate network domain, or by accounts associated with a specified domain, e.g., accounts associated with a company account (e.g., @acme.com).

In some embodiments, sharing service 128 can also deactivate a generated URL or otherwise unshare a content item. For example, each content entry can also include an active sharing flag indicating whether the content is still shared, and sharing service 128 may only return a requested content item if the active sharing flag is set to 1 or true. Thus, access to a previously shared content item can be restricted by changing the value of the active sharing flag. This can allow a user to restrict access to the shared content item without having to move the content item, delete the generated URL, etc. Likewise, sharing service 128 can reactivate sharing by again changing the value of the active sharing flag to 1 or true. A user can thus easily restore access to the content item without the need to generate a new sharing mechanism, e.g., a new URL.

In some embodiments, content management system 110 can designate a location, such as a URL, for uploading a content item. For example, a first user account can request for an upload location from sharing service 128 a, provide the upload location to a second user account (or other user in some cases). The second user account or other user can upload a content item to the first user account using the upload location.

Monitoring Interactions with Shared Content Items

In some embodiments, content management system 110 can provide information about user interactions with a shared content item. In some embodiments, content management system 110 can report that a user is currently viewing the shared content item. For example, client collaboration service 160 can request notifications service 117 to send notifications to other client devices having access to the shared content item when any one client device accesses the shared content item. Notifications service 117 can then notify all client devices regarding access to the shared content item by the one client device. In some embodiments, the interaction data can also serve as a proxy for the presence of a user owning and/or operating the one client device.

In some embodiments, content management system 110 can report a history of user interactions with a shared content item. Collaboration service 126 can query data sources such as metadata database 146 and server file journal 148 to determine that a user account has saved the content item, that a user account has yet to access the content item, etc., and disseminate this information using notification service 117 to other user accounts to determine which user accounts have (or have not) interacted with the shared content item.

In some embodiments, collaboration service 126 can facilitate commenting for content, even if a content item does not natively support commenting functionality. Such comments can be stored in metadata database 146.

In some embodiments, collaboration service 126 can originate and transmit notifications for users. For example, a first user can mention a second user in a comment and collaboration service 126 can send a notification to the second user that he has been mentioned in the comment. Various other content item events can trigger notifications, including deleting a content item, sharing a content item, etc.

In general, collaboration service 126 can provide a messaging platform whereby users can send and receive instant messages, voice calls, emails, etc.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notification service 117 when client device 150 is accessing the content item. Notification service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146. In some embodiments, the storage of such comments can be stored separately from seen state information.

Collaboration service 126 can originate and transmit notification for users. For example, a user can mention another user in a comment and collaboration service 126 can send a notification to that user that he has been mentioned in the comment. Various other content item events can trigger notification, including deleting a content item, sharing a content item, etc.

Collaboration service 126 can provide a messaging platform whereby users can send and receive instant messages, voice calls, emails, etc.

Collaboration on Content Items

Collaboration service 126 can also provide an interactive content item collaboration platform in which users can simultaneously make changes to shared content items, provide comments regarding the shared content items, manage tasks associated with the shared content items, etc. These shared content items can be files that user accounts can create and edit using a content item editor, and can contain elements for enabling collaboration. These collaboration elements may include a collaboration identifier, one or more author and/or editor identifiers, collaboration text, collaboration attributes, interaction information, comments, sharing users, etc. The collaboration elements may be stored in database entries to allow for search and retrieval of the shared content items. Multiple user accounts may access, view, edit, and otherwise collaborate on shared content items at the same time or at different times. In some embodiments, this can be managed through a web interface that enables two users to work on the same copy of a shared content item at the same time.

Collaboration Client Interface

In some embodiments, client collaboration service 160 can provide a native application interface for the purpose of displaying information relevant to a content item being presented on client device 150. In some embodiments, certain content items associated with a native application may not be capable of presenting the collaboration data addressed above. In such embodiments, client collaboration service 160 can detect that a user has opened a content item, and can provide an overlay with additional information for the content item, such as the collaboration data. For example, the additional information can include comments for the content item, a status of the content item, interactions with the content item by other users, etc. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user account. For example, a software package, such as an application running on client device 150, can programmatically make API calls directly to content management system 110 when a user account provides authentication credentials, to read, write, create, delete, share, or otherwise manipulate content.

A user can utilize a user account to view or manipulate content via a web interface generated and served by web interface service 124. For example, the user can navigate in a web browser to a web address associated with the user account provided by content management system 110. Changes or updates to content in content storage 160 made through web interface 124, such as uploading a new version of a content item, can be propagated back to other client devices associated with the user account. For example, multiple client devices, each with their own client software, can be associated with a single account and content items in the account can be synchronized between each of the multiple client devices.

Client device 150 can connect to content management system 110 on behalf of a user account. A user of the user account can directly interact with client device 150, for example when client device 150 is a desktop or laptop computer, phone, television, internet-of-things device, etc. Alternatively or additionally, client device 150 can act on behalf of the user account without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, word processor, spreadsheet program, presentation program, source code control tool, etc. that resides on client device 150 and capable of communicating with content management system 110. In various implementations, client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can manage and synchronize content for more than one account of content management system 110. In such embodiments, client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While this disclosure presents content management system 110 with specific components, it will be understood by one skilled in the art, that the architectural configuration of system 100 is simply one possible configuration and that other configurations with more or fewer components are possible. Further, a service can have more or less functionality, even including functionality described as being associated with another service. Moreover, features described in this disclosure with respect to a particular embodiment can be combined with features described with respect to another embodiment.

While system 100 is presented with specific components, it will be understood by one skilled in the art, that the architectural configuration of system 100 is simply one possible configuration and that other configurations with more or fewer components are possible.

Figure 2:
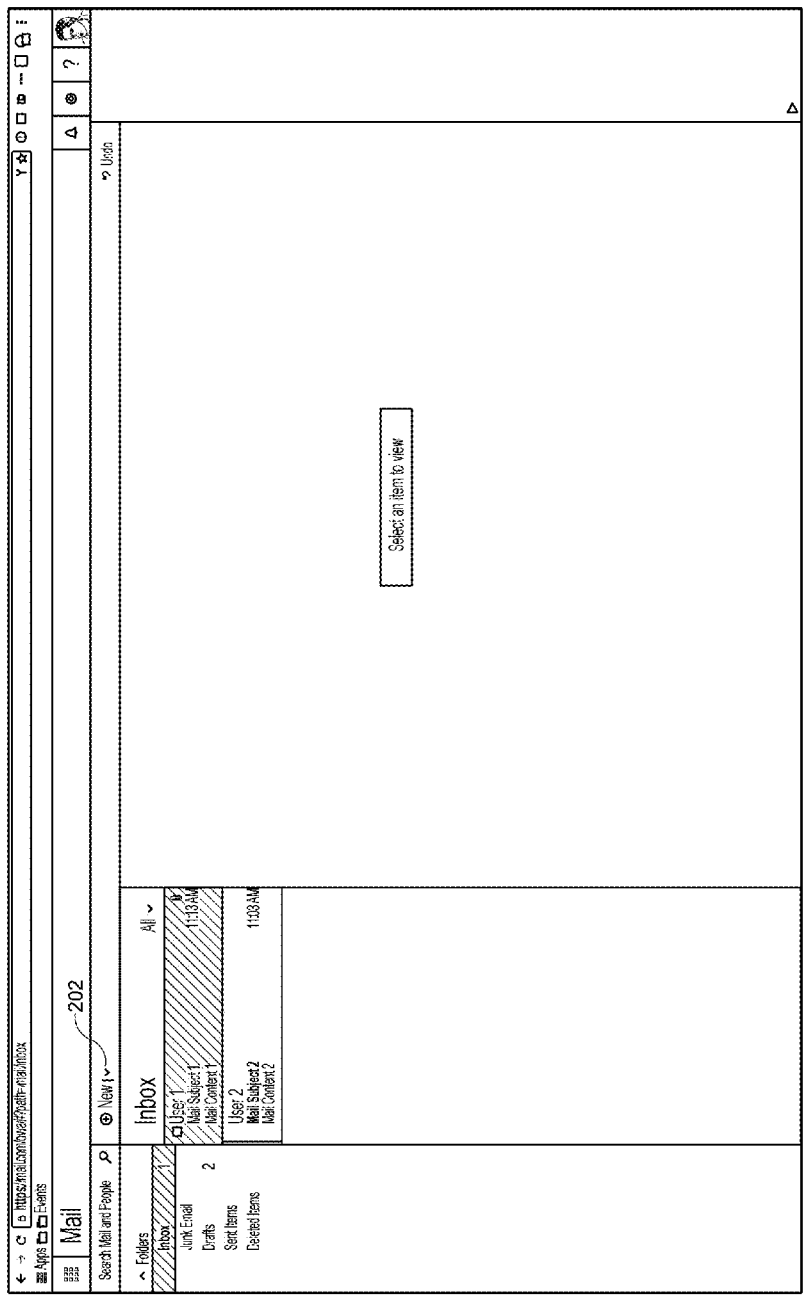
FIG. 2 shows an example graphical user interface of a messaging client on a client device according to some embodiments.

FIG. 2 shows an example graphical user interface 200 of a messaging client on a client device according to some embodiments. For illustrative purposes, graphical user interface 200 in FIG. 2 is a web browser configured to interact with content management system 110 and an email service. However, in other embodiments, graphical user interfaces may be designed for other messaging applications configured to interact with one or more other messaging services. These messaging applications may include, for example, email applications, instant messaging (IM) applications, social networking applications, other client-side service applications, or other web browser interfaces configured to access other types of messaging services.

Graphical user interface 200 may be displayed on a client device and allow a user to view messages, compose messages, and check the status of messages. For example, a user may select graphical user interface element 202 in order to compose a new message (e.g., an email) to be sent to a recipient via the messaging service. In response to receiving input from a user or other indication to create a new message from the user via graphical user interface element 202, the messaging client on the client device may generate and display a graphical user interface for composing a message such as the graphical user interface shown in FIG. 3.

Figure 3:
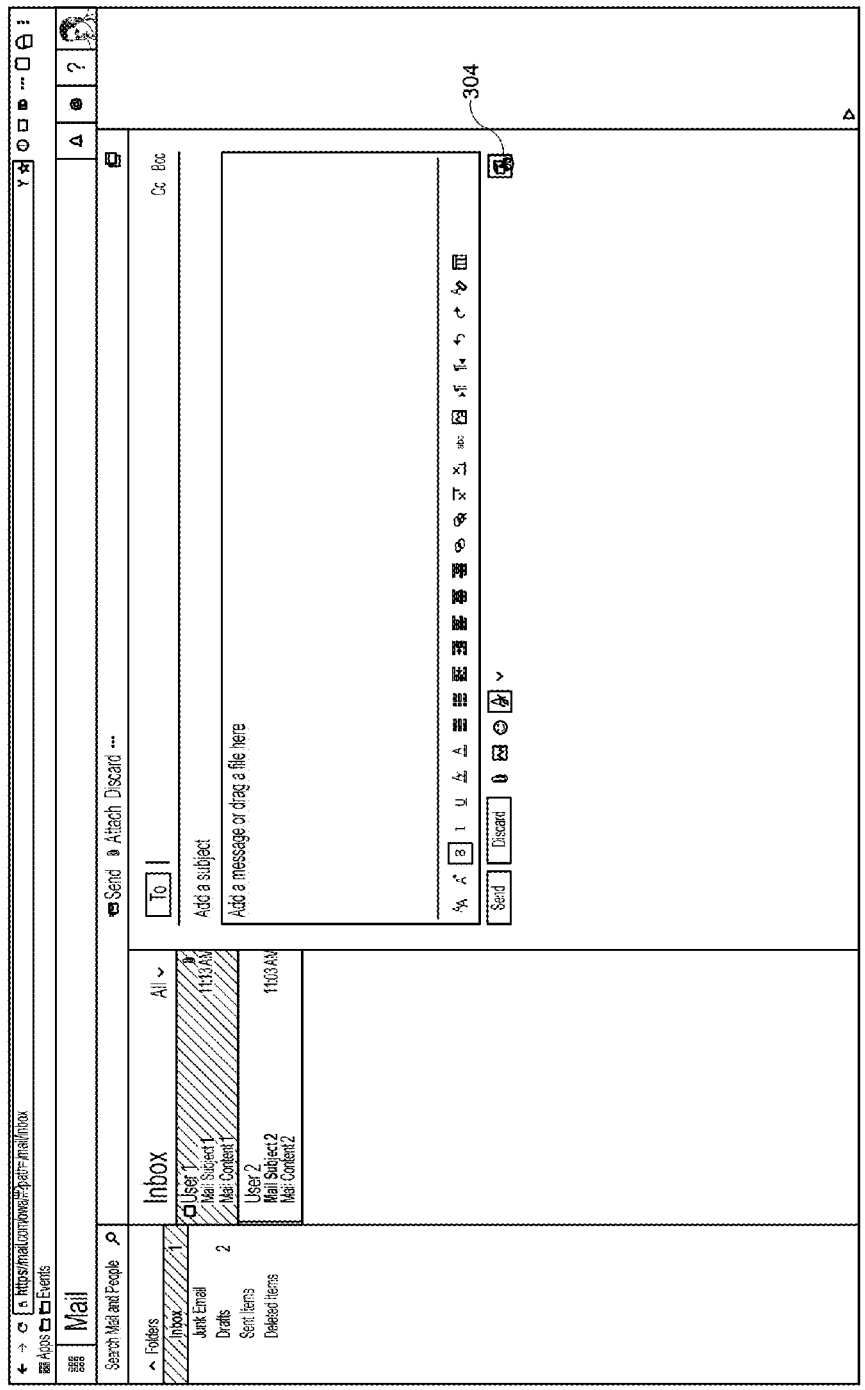
FIG. 3 shows an example graphical user interface for composing a message according to some embodiments.

FIG. 3 shows an example graphical user interface 300 for composing a message according to some embodiments. Graphical user interface 300 may include components configured to, among other things, add recipients of a message, add a subject for the message, add content to a message, format the content of the message, or attach a file located on the client device. Graphical user interface 300 includes a content management icon 304 that is configured to provide content management features provided by an content management system within the messaging client environment. For example, when the messaging client on the client device receives an indication of a user selection of content management icon 304 (as shown in FIG. 3), the messaging client may open and display a content management component.

Figure 4:
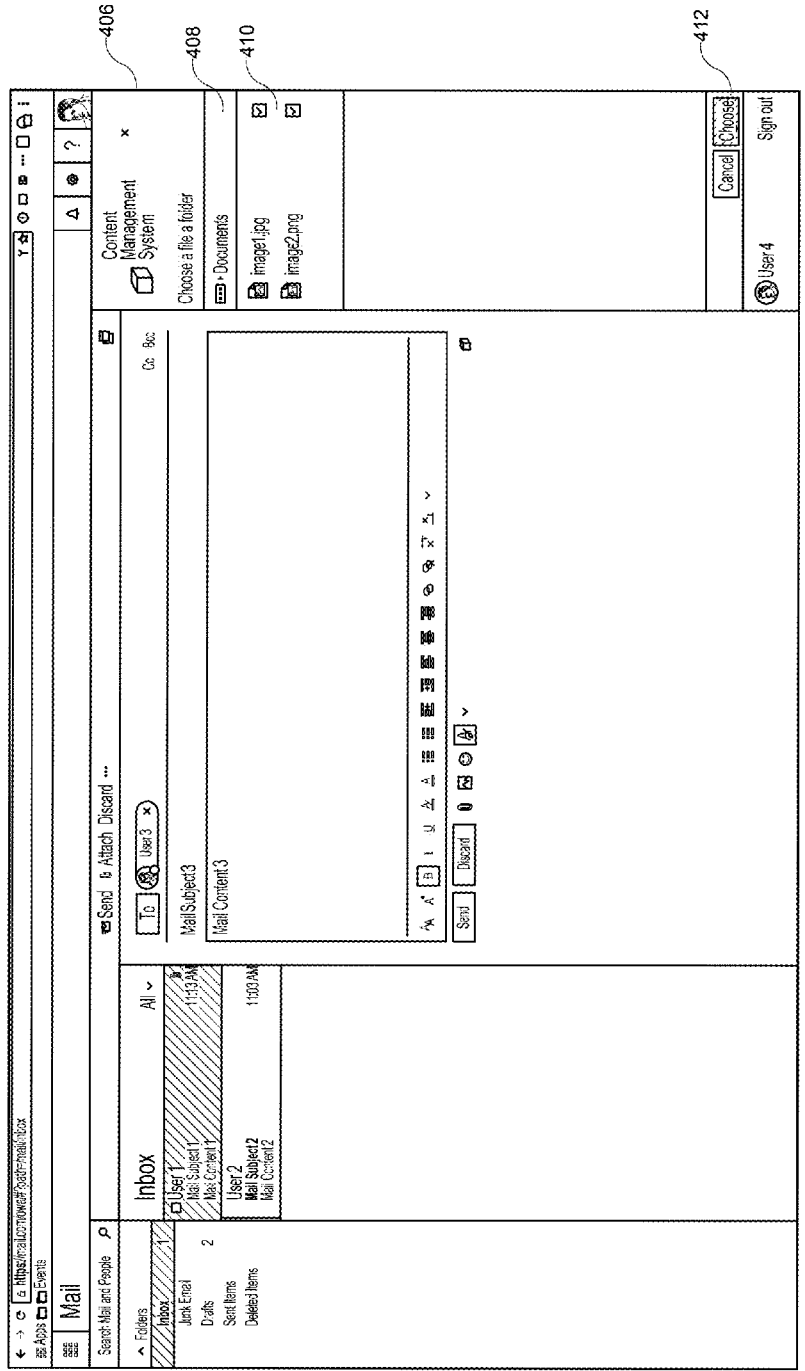
FIG. 4 shows an example graphical user interface including a content management component according to some embodiments.

FIG. 4 shows an example graphical user interface 400 including content management component 406 according to some embodiments. Graphical user interface 400 may display content management component 406 in response to receiving an indication of a user selection (e.g., a user click) of content management icon 304.

Content management component 406 of graphical user interface 400 may provide a location for the user to access content management features provided by content management system 110 from within the messaging client environment. For example, content management component 406 may allow a user to access content items stored by content management system 110, select one or more stored content items, create links to the selected content items, and attach the links to the message being created.

Content management component 406 may include collection selection interface 408 and content item selection interface 410. Content items stored by content management system 110 may be organized in collections of content items. These collections of content items may be grouped automatically based on a common characteristic or grouped by the user. In some embodiments, the collections of content items may resemble a hierarchical file system and content selection interface 408 enables a user to navigate to a location within the file system that a desired content item may be found. Content item selection interface 410 displays the content items located in the current location and enables the user to select one or more content items to be linked to the message being composed.

In graphical user interface 400 shown in FIG. 4, content item selection interface 410 shows that the user has selected both content items ("image1.jpg" and "image 2.png") in the collection entitled "Documents." Once content items are selected, the user may request the attachment of the selected content items by selecting graphical user interface element 412. In response to the selection of interface element 412, the messaging client generates a request to attach the one or more selected content items and sends the request to content management system 110.

When the request is received, content management system 110 authenticates the user and the messaging client and determines whether the user and messaging client are authorized to receive a link for each selected content item. If the messaging client and the user are authenticated and authorized, content management system 110 generates a link for each selected content item and sends each generated link to the messaging client on the client device. The messaging client may then attach the one or more links generated by content management system 110 to the message being composed.

Figure 5:
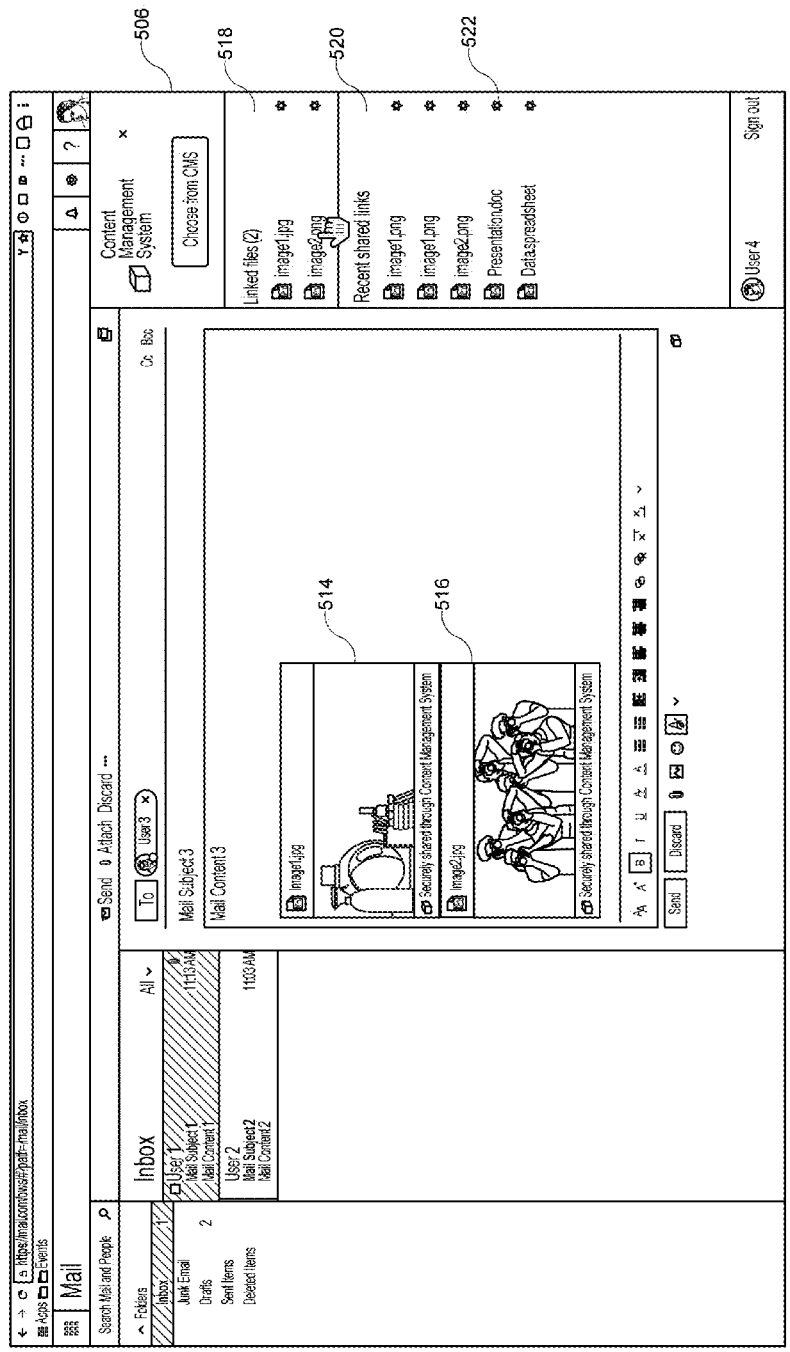
FIG. 5 shows an example graphical user interface for composing a message with attached links from a content management system according to some embodiments.

FIG. 5 shows an example graphical user interface 500 for composing a message with attached links from content management system 110 according to some embodiments. Graphical user interface 500 shows the result of the messaging client attaching the links selected in content item selection interface 410 of FIG. 4 to the message being composed. Graphical user interface 500 includes preview areas 514 and 516 that show which content items stored on content management system 110 have links attached to the message as well as a preview of each content item. For example, the messaging client may determine that the message being composed contains an attached link associated with a content item stored on a content management system and requests a preview for each content item from content management system 110. When the preview for the content item is received, the messaging client may display the preview in preview areas such as preview areas 514 and 516.

Graphical user interface 500 further includes content management component 506 that provides a location for the user to access, from within the messaging client environment, additional content management features provided by content management system 110. For example, content management component 506 includes linked file interface 518 and recently shared links interface 520.

Linked file interface 518 displays one or more content items linked in the message and also enables a user to view or update sharing options for the content items linked in the message by selecting one or more of the displayed content items. For example, FIG. 5 shows a user selection of linked content item "image2.png." In response to receiving the user selection of linked content item "image2.png," the messaging client generates a request for sharing options associated with the "image2.png" content item and sends the request to content management system 110.

Content management system 110 may identify a list of content items stored by content management system 110 that the user recently shared via content management system 110. In some embodiments, the list may be generated in response to a query from the messaging client. Content management system 110 sends the list to the messaging client where it may be displayed in recently shared links interface 520. Recently shared links interface 520 may further enable a user to add links to one or more of the recently shared content items by selecting the content item in recently shared links interface 520.

Although not explicitly shown in FIG. 5, in some embodiments, recently shared links interface 520 may further enable a user to view or update sharing options by, for example, selecting interface element 522 for content item "Presentation.doc." In response to receiving the user selection of content item "Presentation.doc," the messaging client generates a request for sharing options associated with the "Presentation.doc" content item and sends the request to content management system 110.

Figure 6:
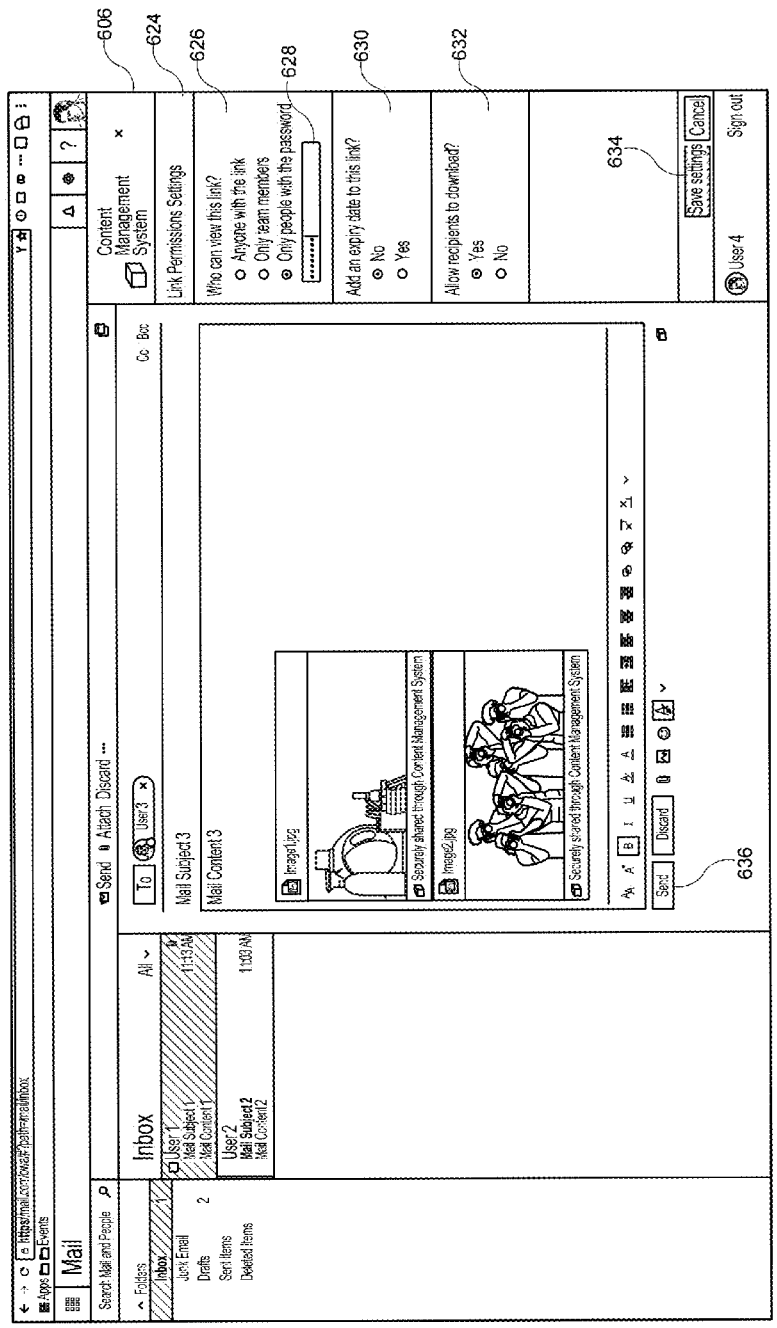
FIG. 6 shows an example graphical user interface for composing a message with sharing options according to some embodiments.

FIG. 6 shows an example graphical user interface 600 for composing a message with sharing options according to some embodiments. Graphical user interface 600 may be displayed in response to receiving the user selection of linked content item "image2.png" as shown in FIG. 6 and the messaging client sending a request for sharing options associated with the "image2.png" content item to content management system 110. In other embodiments, a similar graphical user interface with sharing options for a recently shared link may be displayed based on a user requesting sharing options for a recently shared link, for example, by selecting interface element 522 for content item "Presentation.doc" in FIG. 5.

When a request for sharing options is received by content management system 110, content management system 110 determines the available sharing options for the referenced content item, which may include the currently selected sharing options, and returns the sharing options to the messaging client on the client device. The messaging client may then display graphical user interface 600, which includes content management component 606 that provides a location for the user to access, from within the messaging client environment, additional content management features provided by content management system 110.

According to some embodiments, content management component 606 includes link permissions settings interface 624 that displays the sharing options for a selected content item. In other embodiments, the displayed sharing options may be for all content items stored by content management system 110 with links attached to the message. The sharing options may include, but are not limited to, permissions on who can view a link to the content item 626, an expiration date for the link to the content item 630, and whether a user with permission to view the link to the content item is allowed to download the content item 632 from content management system 110 to the client device. In some embodiments, the sharing options may also, or alternatively, include the option to include a watermark generated by content management system 110 on the selected content item.

Permissions on who can view a link to the content item 626 may include, among other things, anyone with a link, only team members, only specified members of a particular group, only recipients of the message, only members of an approved list of recipients, only people with the correct password, only by accounts associated with a specified domain, etc. Content management component 606 may also include a field 628 for users to create a password to control access to the content item or, in some embodiments, the user can opt to use a default or preexisting password.

The user can view and update sharing options for the selected content item in link permissions settings interface 624 and save the settings 634. In some embodiments, it is not necessary for the user to explicitly save the settings 634. Instead, sharing options may be saved as they are updated or changed by the user or when the user sends the message 636. The messaging client receives the user selected sharing options and sends the selected sharing options to content management system 110. Content management system 110 may then apply the selected sharing options to the selected content item. In this way, all future access to the selected content item stored on content management system 110 may be governed by the sharing options selected by the user from within the messaging client environment.

When the user is done composing the message, attaching links to content items stored on content management system 110, and updating sharing options for the attached links, the user may send the message 636. The messaging client may then send the message with the attached links to content items stored on content management system 110 to a messaging service (e.g., a server associated with the messaging platform/service) for delivery to one or more specified recipients.

Figure 7:
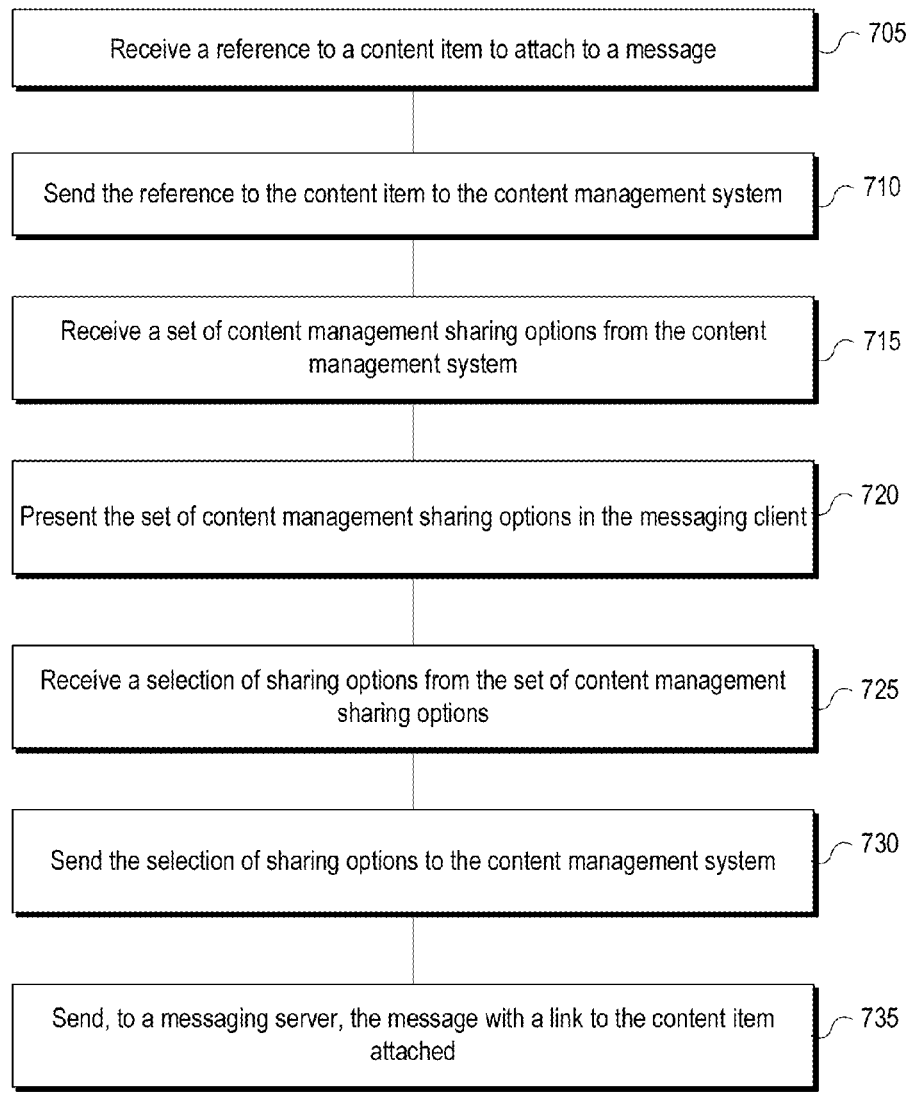
FIG. 7 shows an example method for providing content management features within a messaging environment according to some embodiments.

FIG. 7 shows an example method 700 for providing content management features within a messaging environment according to some embodiments. Although the methods and processes described herein may be shown with certain steps and operations in a particular order, additional, fewer, or alternative steps and operations performed in similar or alternative orders, or in parallel, are within the scope of various embodiments unless otherwise stated.

Method 700 may be implemented by a messaging client on a client device. Client devices may include, for example: desktop computers; mobile computers; mobile communications devices, e.g. mobile phones, smart phones, tablets; wearable devices; smart televisions; set-top boxes; and/or any other network enabled computing devices. The messaging client may be a client-side messaging application installed on the client device configured to communicate with a messaging service such as an email service, an instant messaging (IM) service, or a social networking platform. The messaging application may be a dedicated application (e.g., an email application or instant messaging application) or a non-dedicated application such as a web browser. The messaging client may include a content management component that interacts with content management system 110 and enables content management features to be provided within the messaging client. The content management component may be built into the messaging client or include one or more application plug-ins, add-ins, code snippets, browser extensions, or a combination thereof.

At operation 705, the messaging client on the client device may receive a reference to a content item to attach to a message. Although other alternatives are within the scope of the present disclosure, according to some embodiments, the reference to the content item may come from a user selecting a content item to view or update sharing options (e.g., as illustrated in FIG. 5) or from a user selecting a content item to attach to the message (e.g., as illustrated in FIG. 4).

The messaging client may send the reference to the content item to content management system 110 at operation 710. Based on the reference to the content item, content management system 110 may retrieve a set of content management sharing options for the referenced content item and send the set of content management sharing options to the messaging client on the client device.

At operation 715, the messaging client receives the set of content management sharing options for the referenced content item and, at operation 720, presents the set of content management sharing options to the user. For example, the messaging client may display the set of content management sharing options in a content management component within a graphical user interface such as content management component 606 in FIG. 6. As illustrated in graphical user interface 600 of FIG. 6, the user may review the set of content management sharing options, select certain options, update options, or choose to keep preselected options the same.

At operation 725, the messaging client receives the user selection of sharing options from the set of content management sharing options and sends the selection of sharing options to content management system 110 at operation 730. Upon receiving the selection of sharing options, content management system 110 may apply the selection of sharing options to the referenced content item so that future requests to access the referenced content item stored by content management system 110 will be governed by the selected sharing options.

At operation 735, the messaging client sends, to a messaging server, the message with a link to the content item attached. As discussed above, the messaging server may be associated with an email service, an IM service, a social networking platform, or other messaging service. The messaging service may then deliver the message to the intended recipients. When a recipient retrieves the message from the messaging service, they may view the message with the attached link to the content item on a messaging client on the recipient's client device. To access the content item, the recipient will need to select the link to the content item and request access to the content item from content management system 110 and content management system 110 will grant access to the linked content item based on the user selection of sharing options sent to content management system 110 at operation 730.

According to some embodiments, a messaging client on a client device may also coordinate or integrate with a content management client also running on the client device. For example, a messaging client may display a graphical user interface that includes a content management component that enables a user to navigate a file system associated with the user on content management system 110 as well as a local file system on the client device. The messaging client may receive user instructions to attach local content items on the client device as well as links to content items stored by content management system 110.

As described above, content management system 110 can be configured to support synchronization of content with one or more content management clients running on client devices. Content reference numbers or IDs facilitate the synchronization of content items on the client devices and content management system 110. According to some embodiments, the messaging client may coordinate with the content management client running on the client device to allow a user to navigate a local file system to select a synchronized content item to attach to the message. Because the content item on the client device is synchronized with a corresponding content item stored by content management system 110, the messaging client need not use additional bandwidth to upload and send the attached content. Instead, messaging client may request a link to the selected content item from content management system 110 based on the content ID of the selected content item and attach the link to the selected content item to the message. Providing the link to the content item stored by content management system 110 instead of attaching a copy of the locally stored content item further provides the user with additional content management features such as sharing options and sharing state information for the content item.

According to some embodiments, a content management client running on a client device may generate file placeholders in order to aid synchronization of content with content stored by content management system 110. A file placeholder may appear like a content item to an operating system or other applications on a client device, but instead of storing data for a content item, the file placeholder stores a pointer to the corresponding content item stored by content management system 110. Accordingly, the messaging client may coordinate with the content management client running on the client device to allow a user to navigate a local file system to select a file placeholder associated with a content item stored by content management system 110 and attach the file placeholder to the message. Once the message is sent, the recipient of the message may download the file placeholder and attempt to access the content item stored by content management system 110. Providing the file placeholder associated with the content item stored by content management system 110 allows for some additional content management features such as sharing options and sharing state information for the content item.

In various embodiments a messaging client may include a content management component that interacts with content management system 110 and enables additional or alternative content management features to be provided within the messaging client. For example the content management component may enable a sender of a message with an attached link to a content item stored by content management system 110 to view sharing state information for that content item.

Figure 8:
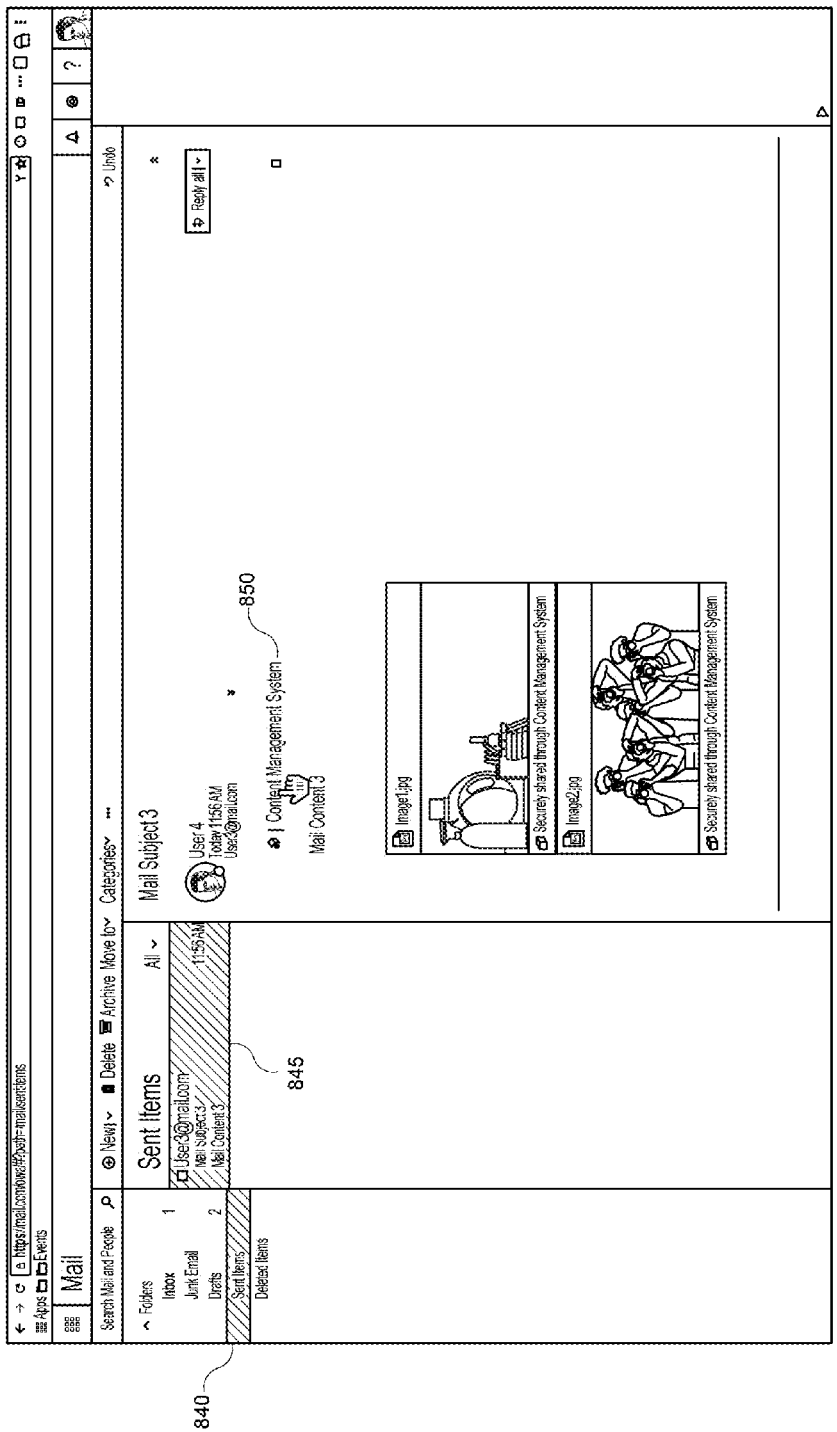
FIG. 8 shows an example graphical user interface of a messaging client on a client device according to some embodiments.

FIG. 8 shows an example graphical user interface 800 of a messaging client on a client device according to some embodiments. For illustrative purposes, graphical user interface 800 in FIG. 8 is a web browser configured to interact with content management system 110 and an email service. However, in other embodiments, graphical user interfaces may be designed for other messaging applications configured to interact with one or more other messaging services. These messaging applications may include, for example, email applications, instant messaging (IM) applications, social networking applications, other client-side service applications, or other web browser interfaces configured to access other types of messaging services.

Graphical user interface 800 may be displayed on a client device and allow a user to view messages, compose messages, and check the status of messages. For example, a user may select graphical user interface element 840 in order to view a list of sent messages (e.g., sent emails). The user may select one sent message 845 to view the contents of the sent message and details associated with the sent message. Details may include a list of recipients, attachments, or the timestamp for when the message was sent.

In some embodiments, the messaging client may receive additional details from the messaging service such as a timestamp for when the message was viewed by a recipient. Additionally, various embodiments are directed to providing content management features such as enabling a sender of a message to determine whether a content item attached to the message was viewed. For example, the user may select content management icon or option 850. In response to receiving input from a user via content management icon or option 850, the messaging client on the client device may generate and display a content management component to show sharing state information to the user.

Figure 9:
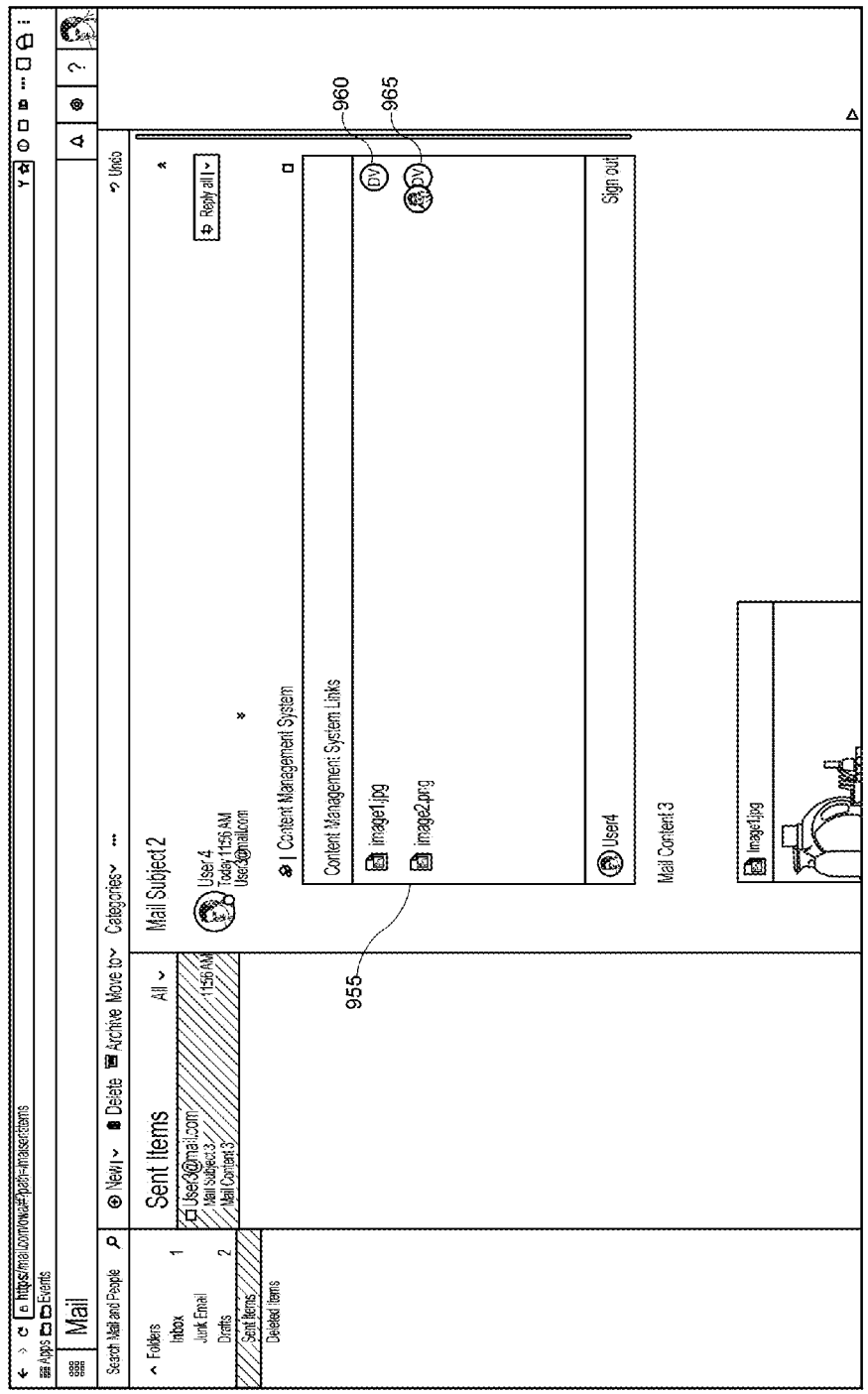
FIG. 9 shows an example graphical user interface for viewing details of a sent message with attached links from content management system according to some embodiments.

FIG. 9 shows an example graphical user interface 900 for viewing details of a sent message with attached links from content management system 110 according to some embodiments. Graphical user interface 900 shows the result of the user selecting content management icon or option 850 in FIG. 8 to view sharing state information for the attached links in the sent selected message.

In particular, graphical user interface 900 includes content management component 955 that provides a location for the user to access, from within the messaging client environment, additional content management features provided by content management system 110. For example, content management component 955 includes a list of content items linked to the sent message as well as sharing state information 960 and 965 for each of the linked content items.

Although sharing state information 960 and 965 in FIG. 8 is shown as a list of icons where each icon represents a user that has accessed content items associated with links attached to the sent message, other types of sharing state information may be presented. Sharing state information may include a list of users that have accessed the content item, timestamps for the first time each user has accessed the content item, timestamps for the most recent time each user has accessed the content item, additional timestamps if recorded by content management system 110, type of actions taken by the user (e.g., view, edit, print, download to client machine, copy to recipient user's account, etc.), or presence state for the content item. Presence state may include a list of users currently accessing the content item stored on the content management system.

Furthermore, other means of presenting the sharing state information is also within the scope of various embodiments. For example, spreadsheets, lists, charts, or other visualizations of sharing state information may be displayed. Certain information may be presented in separate interfaces within the messaging client or be presented in response to user action. In some embodiments, a user may move a cursor over one of the icons corresponding to a particular recipient in sharing state information 960 or click the icon to view additional sharing state information. For example, a pop-up window may appear with timestamp and action type information associated with that particular recipient's access to the linked content item "image1.jpg."

Although some embodiments relate to content management features provided in the context of viewing sent messages, additional embodiments may relate to other interfaces within the messaging client such as in an inbox interface inbox of a recipient where a link to a content item stored by content management system 110 was sent to one or more recipients (either in the same message or separate message).

Figure 10:
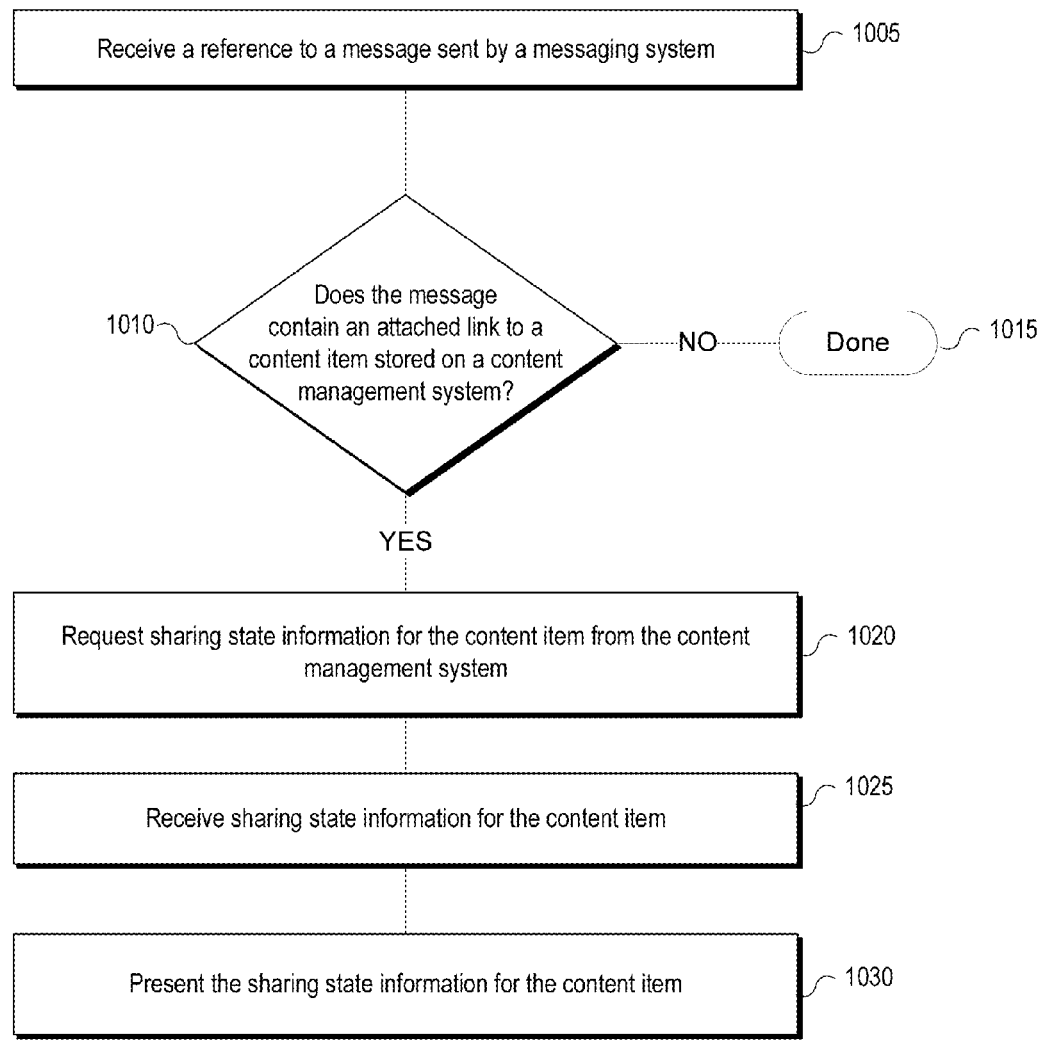
FIG. 10 shows an example method for providing content management features within a messaging environment according to some embodiments.

FIG. 10 shows an example method 1000 for providing content management features within a messaging environment according to some embodiments. Method 1000 may be implemented by a messaging client on a client device. Client devices may include network enabled computing devices separate from a messaging service and content management system 110. The messaging client may be a client-side messaging application installed on the client device configured to communicate with the messaging service and may include a content management component that interacts with content management system 110 and enables content management features to be provided within the messaging client.

At operation 1005, the messaging client on the client device may receive a reference to a message sent by the messaging service. Although other alternatives are within the scope of the present disclosure, according to some embodiments, the reference to the sent message may come from a user selecting a sent message 845 to view details of the sent message of from the user selecting content management icon or option 850 as illustrated in FIG. 8.

The messaging client determines, at operation 1010, whether the referenced message contains an attached link associated with a content item stored on content management system 110. If there is no attached link to a content item stored on content management system 110, method 1000 ends at operation 1015. If there is at least one attached link, the messaging client sends a request for sharing state information associated with the one or more linked content item to content management system 110 at operation 1020.

Upon receiving the request, content management system 110 retrieves sharing state information associated with the one or more linked content item and sends the sharing information to the messaging client on the client device. At operation 1025, the messaging client receives the sharing state information associated with the content item and, at operation 1030, presents the sharing state information associated with the one or more linked content items. Referring to the illustrative example of graphical user interface 900 in FIG. 9, the sharing state information associated with the one or more linked content items may be displayed in content management component 955.

According to various embodiments, content management component 955 may also enable a user to alter sharing options such as extending link expiration times, revoke access to one or more users, or limit types of access. For example, the messaging client on the client device may receive an instruction from the user to view or update sharing options for a linked content item and, in response, send a request for the sharing options associated with the linked content item to content management system 110. Content management system 110 may retrieve a set of content sharing options for the referenced content item and send the set of sharing options to the messaging client on the client device.

The messaging client receives the set of content management sharing options for the referenced content item and presents the set of sharing options to the user in, for example, content management component 955. The user may review the set of sharing options, select certain options, update options, or choose to keep preselected options the same. If the user changes any sharing options for the referenced content item, the messaging client sends the user selection of sharing options to content management system 110. Upon receiving the selection of sharing options, content management system 110 may apply the selection of sharing options to the referenced content item so that future requests to access the referenced content item stored by content management system 110 will be governed by the selected sharing options.

According to some embodiments, content management features of the messaging client or application may be provided via a content management plug-in. The content management plug-in enables the presentation of content management components or interfaces (for example, a web browser frame) to be displayed within the messaging client. When a content item is selected to be attached to a message, the messaging client requests a link to the content item from content management system 110. Content management system 110 creates a link (via sharing module 130) and a link preview (e.g., an image or thumbnail representing the content item) and sends the link and the link preview to the messaging client. The messaging client can then attach the link to the message and render the link preview in the appropriate interface or web frame.

Figure 11A:
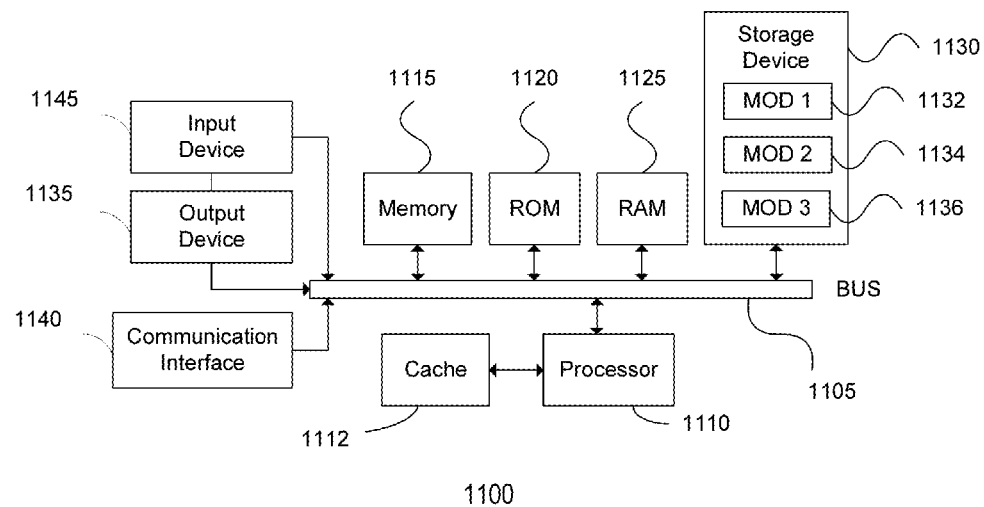
FIG. 11A shows an example possible system embodiment for implementing various embodiments of the present technology.
Figure 11B:
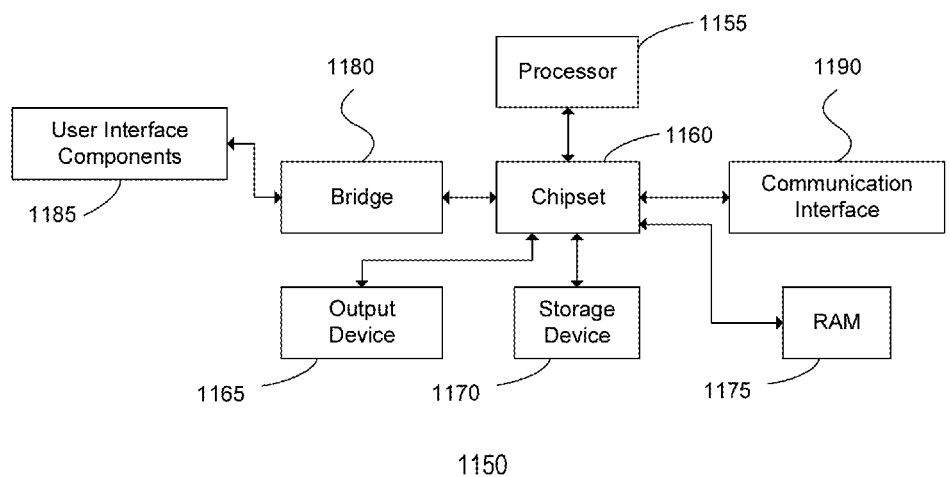
FIG. 11B shows an example possible system embodiment for implementing various embodiments of the present technology.

FIG. 11A and FIG. 11B show example possible system embodiments. The appropriate embodiments will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Example system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates a computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that example systems 1100 and 1150 can have more than one processor 1110 or be part of a group or cluster of computing devices networked together to provide greater processing capability.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   receiving, in a messaging client on a client device, a reference to a content item to attach to a message, wherein the content item is stored on a content management system and is associated with a content management account of a user;
   transmitting, to the content management system, in response to receiving the reference to the content item to attach, a request for a set of currently selected content management sharing options associated with the content item, wherein the set of currently selected content management sharing options are stored by the content management system;
   receiving, from the content management system, the set of currently selected content management sharing options for the content item, the set of currently selected content management sharing options including an expiration of access to the content item;
   presenting, to the user in a content management component within the messaging client, the set of currently selected content management sharing options for the content item;
   receiving a selection comprising an update to the expiration of access to the content item in the set of currently selected content management sharing options;
   sending the selection to the content management system, wherein the content management system is configured to apply the selection of the expiration of access to the content item; and
   sending the message to a messaging service associated with the messaging client, wherein the message comprises an attached link to the content item stored on the content management system.

2. The computer-implemented method of claim 1, wherein the reference to the content item is received as a result of a user input to view or update sharing options.

3. The computer-implemented method of claim 1, wherein the reference to the content item is received as a result of a user selection of a content item to attach to the message.

4. The computer-implemented method of claim 1, wherein the messaging client is an email application and the messaging service is an email service.

5. The computer-implemented method of claim 1, wherein the messaging client is a web browser and the messaging service is an email service.

6. The computer-implemented method of claim 1, wherein the set of content management sharing options further includes at least one of an ability to download the content item to a local machine, a password required to access the content item, an application of a watermark to the content item, or a list of groups or individuals that are permitted to access the content item.

7. The computer-implemented method of claim 1, wherein the messaging service is separate from the content management system and the client device communicates with the content management system and the messaging service via a network.

8. The computer-implemented method of claim 1, further comprising:
   sending, to the content management system, a request for the link to the content item;
   receiving, from the content management system, the link to the content item; and
   embedding the link to the content item in the message.

9. A non-transitory computer readable medium storing instructions, the instructions, when executed by a computing system, cause the computing system to perform operations comprising:
   receiving, in a messaging client on a client device, a reference to a content item, wherein the content item is stored on a content management system;
   transmitting, to the content management system, in response to receiving the reference to the content item, a request for a set of currently selected sharing options associated with the content item, wherein the set of currently selected sharing options are stored by the content management system;
   receiving, from the content management system, the set of currently selected sharing options for the content item, the set of currently selected sharing options including an expiration of access to the content item;

presenting, to a user in a content management component within the messaging client, the set of currently selected sharing options for the content item;

receiving, via the messaging client, a user selection comprising an update to the expiration of access to the content item; and sending the user selection to the content management system, wherein the content management system is configured to apply the user selection of the expiration of access to the content item.

10. The non-transitory computer readable medium of claim 9, the operations further comprising sending a message to a messaging service associated with the messaging client, wherein the message comprises an embedded link to the content item stored on the content management system.

11. The non-transitory computer readable medium of claim 9, the operations further comprising:

sending, to the content management system, a request for a link to the content item;

receiving, from the content management system, the link to the content item; and embedding the link to the content item in a message.

12. A system comprising:

a processor; and a non-transitory computer readable medium storing instructions that, when executed by the system, cause the system to perform operations comprising:

receiving, in a messaging client associated with a sender of a previously sent message, a user selection of the previously sent message;

determining, in response to receiving the user selection of the previously sent message, that the previously sent message contains an attached link associated with a content item stored on a content management system;

sending, to the content management system, a request for sharing state information for the content item associated with the attached link contained in the previously sent message;

receiving, from the content management system, the sharing state information for the content item associated with the attached link contained in the previously sent message; and displaying, in the messaging client associated with a sender of the previously sent message, the sharing state information for the content item associated with the attached link contained in the previously sent message, wherein the sharing state information includes a list of users that have accessed the content item.

13. The system of claim 12, wherein the sharing state information associated with the content item further comprises a list of users that are currently accessing the content item.

14. The system of claim 13, wherein the list of users that have accessed the content item further comprises a timestamp corresponding to a first time a user accesses the content item.

15. The system of claim 13, wherein the list of users that have accessed the content item further comprises a most recent time the user accessed the content item.

16. The system of claim 12, wherein the reference to the message sent by the messaging service is received as a result of a user selection of a content management option in a graphical user interface associated with the messaging client.

17. The system of claim 12, wherein the messaging client is an email application and the messaging service is an email service.

18. The system of claim 12, wherein the messaging client is a web browser and the messaging service is an email service.

19. The system of claim 12, further comprising a communication interface configured to communicate with the content management system and the messaging service via a network.

* * * * *